(12) United States Patent
Uwai et al.

(10) Patent No.: US 10,263,288 B2
(45) Date of Patent: Apr. 16, 2019

(54) LITHIUM ION SECONDARY BATTERY PRODUCTION METHOD

(71) Applicant: Nissan Motor Co., Ltd., Yokohama-shi, Kanagawa (JP)

(72) Inventors: Kenta Uwai, Kanagawa (JP); Kazuki Miyatake, Kanagawa (JP); Ikuma Matsuzaki, Kanagawa (JP); Masanobu Sato, Kanagawa (JP); Yusuke Sasaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/550,074

(22) PCT Filed: Feb. 16, 2015

(86) PCT No.: PCT/JP2015/054176
§ 371 (c)(1),
(2) Date: Aug. 10, 2017

(87) PCT Pub. No.: WO2016/132444
PCT Pub. Date: Aug. 25, 2016

(65) Prior Publication Data
US 2018/0034097 A1  Feb. 1, 2018

(51) Int. Cl.
*H01M 10/058* (2010.01)
*H01M 10/04* (2006.01)
(Continued)

(52) U.S. Cl.
CPC ........... *H01M 10/058* (2013.01); *H01M 4/13* (2013.01); *H01M 4/136* (2013.01); *H01M 4/362* (2013.01);
(Continued)

(58) Field of Classification Search
None
See application file for complete search history.

(56) References Cited

FOREIGN PATENT DOCUMENTS

| CN | 101872879 A | 10/2010 |
|---|---|---|
| JP | 2005-26145 A | 1/2005 |

(Continued)

OTHER PUBLICATIONS

Machine translation of Japanese Patent Publication No. 2013-149477 (Year: 2013).*

*Primary Examiner* — Wyatt P McConnell
(74) *Attorney, Agent, or Firm* — Global IP Counselors, LLP

(57) ABSTRACT

A production method is provided for producing a lithium ion secondary battery. The lithium ion secondary battery has an external casing that houses an electrolytic solution and a power generating element. The power generating element includes a positive electrode and a negative electrode layered with a separator. The production method includes first charging the lithium ion secondary battery at a voltage range of 4.0 V or lower and then opening the external casing of the lithium ion secondary battery that has been charged at a range of 4.0 V or lower to discharge gas inside the lithium ion secondary battery to the exterior. Next, the production method further includes re-sealing the external casing and charging the lithium ion secondary battery from which the gas has been discharged until the cell voltage is greater than 4.0 V.

12 Claims, 12 Drawing Sheets

(51) Int. Cl.
*H01M 10/0525* (2010.01)
*H01M 10/44* (2006.01)
*H01M 4/13* (2010.01)
*H01M 4/136* (2010.01)
*H01M 4/36* (2006.01)
*H01M 4/66* (2006.01)
*H01M 4/02* (2006.01)

(52) U.S. Cl.
CPC ......... *H01M 4/665* (2013.01); *H01M 10/049* (2013.01); *H01M 10/0481* (2013.01); *H01M 10/0525* (2013.01); *H01M 10/446* (2013.01); *H01M 2004/021* (2013.01); *H01M 2004/028* (2013.01); *Y02T 10/7011* (2013.01)

(56) References Cited

FOREIGN PATENT DOCUMENTS

| | | |
|---|---|---|
| JP | 2008-27741 A | 2/2008 |
| JP | 2010-21104 A | 1/2010 |
| JP | 2013-110017 A | 6/2013 |
| JP | 2013-149477 A | 8/2013 |
| JP | 2013-149521 A | 8/2013 |
| KR | 10-2002-0079346 A | 10/2002 |
| KR | 10-0669314 B1 | 1/2007 |
| KR | 2014-0068551 A | 6/2014 |

\* cited by examiner

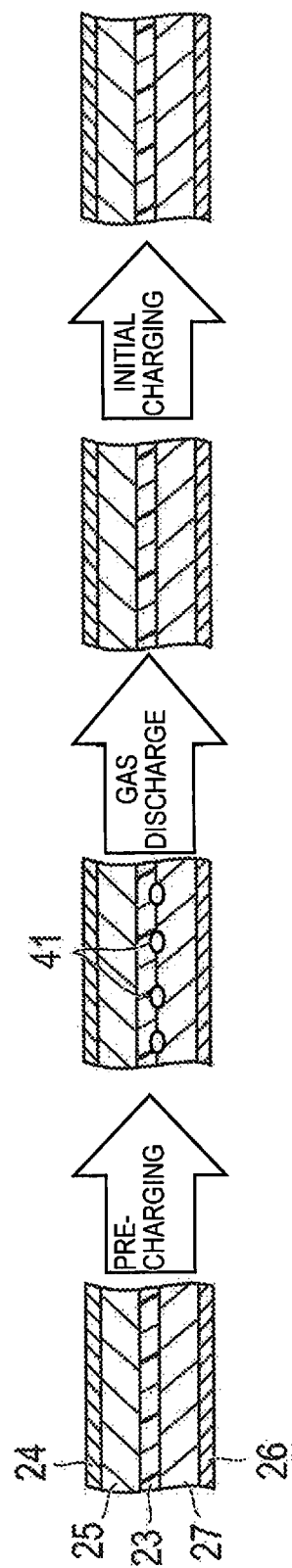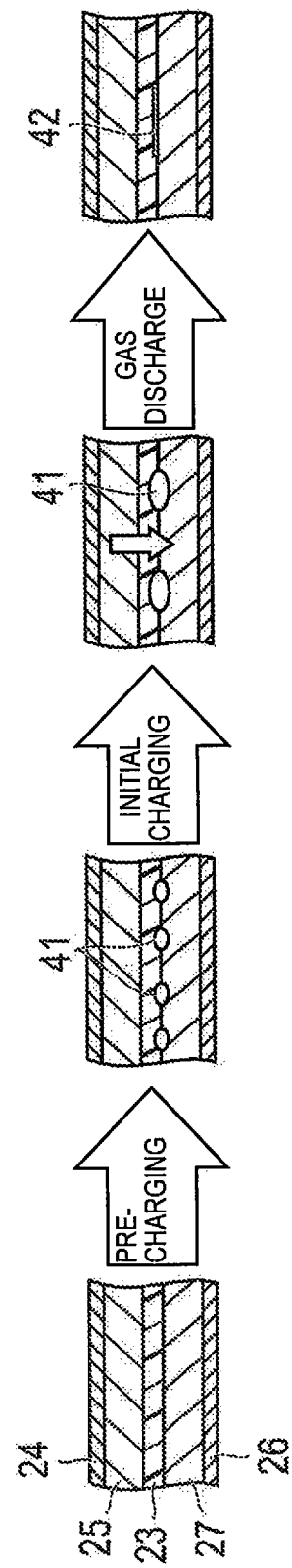
FIG. 5A
FIG. 5B

LITHIUM ION SECONDARY BATTERY PRODUCTION METHOD

CROSS-REFERENCE TO RELATED APPLICATIONS

This application is a U.S. National stage application of International Application No. PCT/JP2015/054176, filed Feb. 16, 2015.

BACKGROUND

Field of the Invention

The present invention relates to a lithium ion secondary battery production method.

Background Information

Lithium ion secondary batteries that are capable of repeated charging and discharging have attracted attention as a motor driving power source for electric vehicles (EV) and hybrid vehicles (HEV). A lithium ion secondary battery (cell) is configured by having, sealed inside an external casing, an electrolytic solution along with a power generating element comprising a positive electrode and a negative electrode layered through a separator.

In a lithium ion secondary battery production process, an initial charging step, in which the lithium ion secondary battery is charged to a fully-charged state, is carried out, after which a gas discharge step, in which the gas inside the lithium ion secondary battery is discharged to the exterior, is carried out (for example see, Japanese Laid Open Patent Application No. 2013-149521—Patent Document 1). According to the gas discharge step, it is possible to prevent the gas inside the lithium ion secondary battery from deteriorating the battery characteristics.

SUMMARY

However, in the production steps described above, there is the problem that lithium metal is deposited on the negative electrode surface in the initial charging step due to gas that is generated in the process of charging the lithium ion secondary battery, when an aqueous binder is used in the negative electrode of the lithium ion secondary battery. Deposition of lithium metal on the negative electrode surface may reduce the battery capacity, which is not preferable.

The present invention was made to solve the problem described above. Therefore, an object of the present invention is to provide a lithium ion secondary battery production method capable of preventing lithium metal from being deposited on a negative electrode surface in an initial charging step of charging the lithium ion secondary battery to a fully-charged state to increase battery capacity.

The above-described objects of the present invention can be achieved by the following means.

The lithium ion secondary battery production method according to the present invention is a production method for a lithium ion secondary battery having, sealed inside an external casing, an electrolytic solution along with a power generating element comprising a positive electrode and a negative electrode layered through a separator, in which the lithium ion secondary battery is charged at a cell voltage range of 4.0 V or lower. In the production method for a lithium ion secondary battery according to the present invention, the external casing of the lithium ion secondary battery that has been charged at a range of 4.0 V or lower is opened to discharge the gas inside the lithium ion secondary battery to the exterior, after which the external casing is re-sealed. Then, in the production method for a lithium ion secondary battery according to the present invention, the lithium ion secondary battery from which the gas has been discharged is charged until the cell voltage is greater than 4.0 V. In a step for charging the lithium ion secondary battery at a cell voltage range of 4.0 V or lower, the lithium ion secondary battery is charged at a cell voltage range of 2.8 V or lower, and then, the lithium ion secondary battery that has been charged at a range of 2.8 V or lower is charged at a cell voltage range of equal to or greater than 2.8 V and equal to or less than 4.0 V.

According to the present invention, before the lithium ion secondary battery is charged to a cell voltage that exceeds 4.0 V, which is close to a full charge, the lithium ion secondary battery is charged at a range of 4.0 V or lower, to discharge gas. Accordingly, it is possible to prevent lithium metal from being deposited on a negative electrode surface, in an initial charging step of charging the lithium ion secondary battery to a fully-charged state. As a result, it is possible to provide a lithium ion secondary battery in which the battery capacity is increased.

BRIEF DESCRIPTION OF THE DRAWINGS

Referring now to the drawings, a lithium ion secondary battery production method is illustrated.

FIGS. 5A and 5B are views illustrating the action and effect of the production method for a lithium ion secondary battery.

DETAILED DESCRIPTION OF THE EMBODIMENTS

Figure 1:
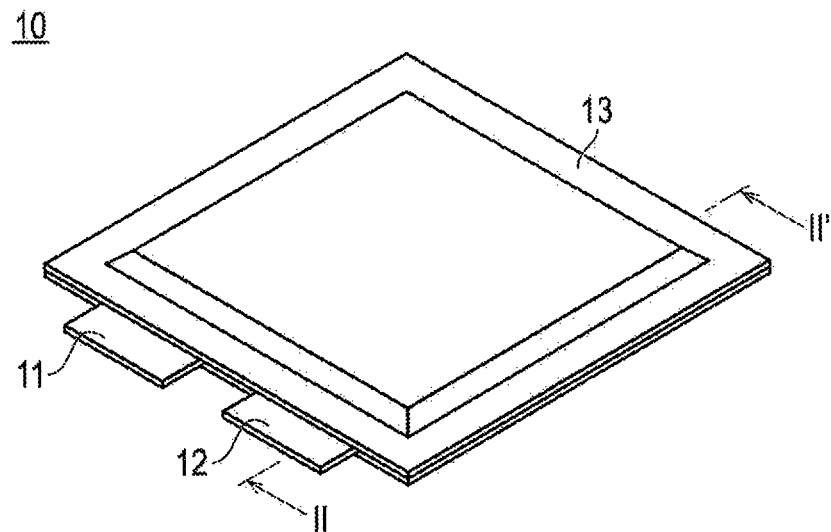
FIG. 1 is a perspective view illustrating the outer appearance of a lithium ion secondary battery.

Illustrative embodiments of the present invention will be described below, with reference to the drawings. In the drawings, similar members are given the same reference symbols. The dimensional ratios in the drawings may be exaggerated for convenience of explanation and may be different from the actual ratios.

Figure 2:
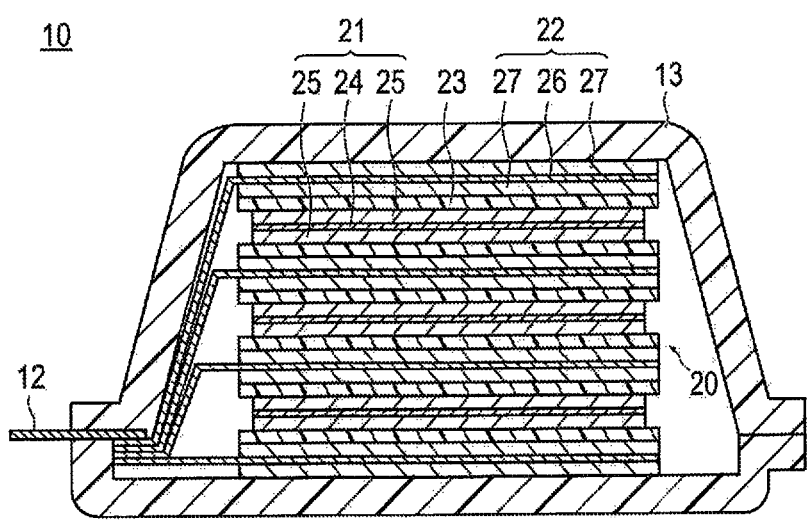
FIG. 2 is a schematic cross-sectional view taken along line II-II' in FIG. 1.

First, a lithium ion secondary battery 10 according to one embodiment of the present invention will be described, with reference to FIGS. 1 and 2. FIG. 1 is a perspective view illustrating the outer appearance of the lithium ion secondary battery 10, and FIG. 2 is a schematic cross-sectional view taken along line II-II' in FIG. 1.

The lithium ion secondary battery 10 has a flat rectangular shape, and a positive electrode lead 11 and a negative electrode lead 12 extend from the same end of an external casing 13. A power generating element 20 in which a charge/discharge reaction proceeds is housed inside the external casing 13, along with an electrolytic solution.

The power generating element 20 has a configuration in which a positive electrode 21 and a negative electrode 22 are layered through a separator 23. The positive electrode 21 is made by a positive electrode active material layer 25 being formed on both sides of a sheet-like positive electrode current collector 24, and the negative electrode 22 is made by a negative electrode active material layer 27 being formed on both sides of a sheet-like negative electrode current collector 26. The separator 23 is a sheet-like porous material, which holds an electrolytic solution. In the power generating element 20, a positive electrode 21, a separator 23 and a negative electrode 22 are laminated such that one positive electrode active material layer 25 and a negative electrode active material layer 27 adjacent thereto, are facing each other across the separator 23. The number of laminations of the positive electrode 21, the separator 23, and the negative electrode 22 is appropriately set giving consideration to the required battery capacity, and the like.

A positive electrode tab and a negative electrode tab are respectively provided to the positive electrode current collector 24 and the negative electrode current collector 26. The positive electrode tab and the negative electrode tab are respectively attached to the positive electrode lead 11 and the negative electrode lead 12.

The lithium ion secondary battery 10 is a common lithium ion secondary battery, produced using various materials. For example, aluminum foil is used for the positive electrode current collector 24, and a composite oxide, such as $LiMn_2O_4$, $LiCoO_2$, and $LiNiO_2$ is used as the positive electrode active material. Additionally, copper foil is used for the negative electrode current collector 26, and a carbon material, such as graphite, carbon black, and hard carbon is used as the negative electrode active material. The positive electrode active material is bound by a binder, such as polyvinylidene-fluoride (PVdF) or the like, and a conductive assistant, such as a carbon material, is added if necessary. The negative electrode active material is bound by an aqueous binder, such as styrene butadiene rubber (SBR)/carboxymethyl cellulose (CMC) mixed binder, or the like, and a conductive assistant, such as a carbon material, is added if necessary. In addition, for example, a polyolefin microporous membrane is used as the separator 23, and the electrolytic solution has a mode in which a lithium salt, such as $LiPF_6$, or the like, is dissolved in a mixed solvent of ethylene carbonate (EC) and diethyl carbonate (DEC). An electrolyte additive, such as methylene methane disulfonate (MMDS), vinylene carbonate (VC), and fluoroethylene carbonate (FEC) is added to the electrolytic solution. A laminate film with a three-layer structure, in which polypropylene (PP), aluminum, and nylon (registered trademark) are layered in order, is used as the external casing 13. However, the materials of the members of the lithium ion secondary battery 10 are not limited to the materials described above, and various materials are used.

Figure 3:
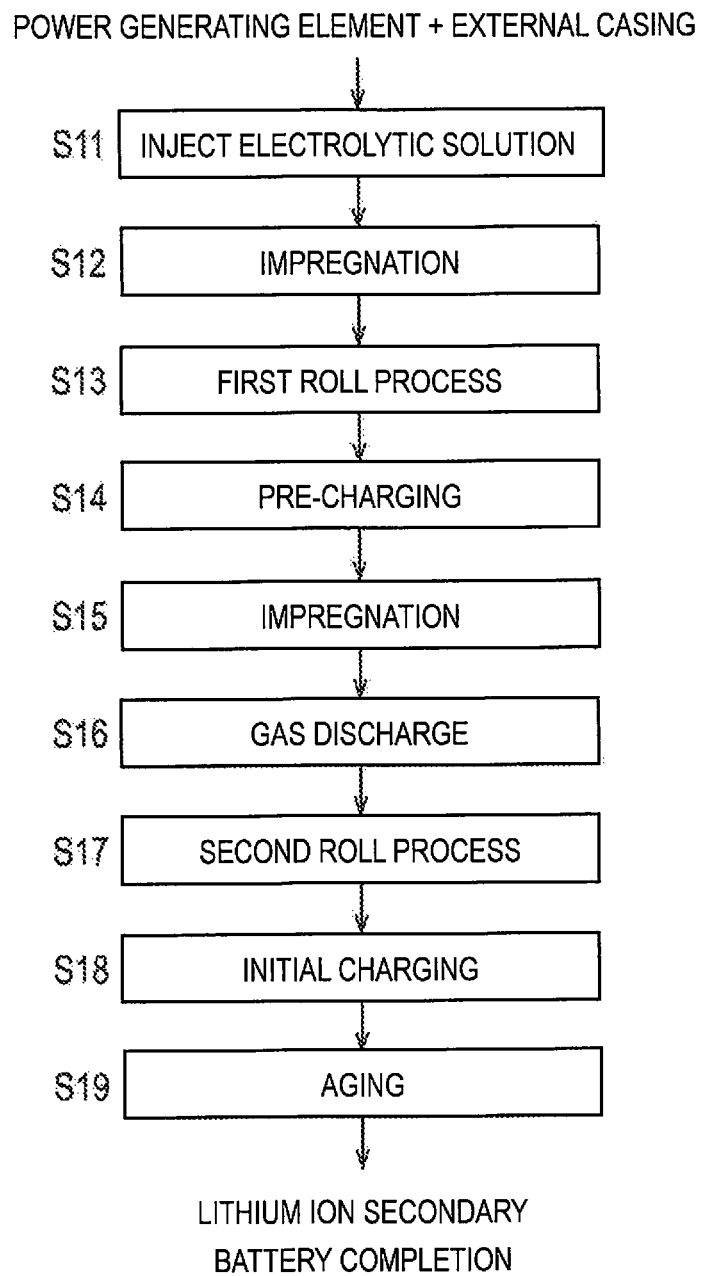
FIG. 3 is a flowchart illustrating a production method for a lithium ion secondary battery.

The production method for a lithium ion secondary battery 10 will be described next, with reference to FIG. 3. FIG. 3 is a flowchart illustrating the production method for a lithium ion secondary battery according to the present embodiment. As illustrated in FIG. 3, the production method for a lithium ion secondary battery according to the present embodiment comprises an electrolytic solution injection step, a first impregnation step, a first roll processing step, a pre-charging step, a second impregnation step, a gas discharge step, a second roll processing step, an initial charging step, and an aging step.

In the electrolytic solution injection step illustrated in Step S11, an electrolytic solution is injected in an external casing 13 housing a power generating element 20, and the external casing 13 is sealed. Giving consideration to a reduction in the electrolytic solution due to repeated charging and discharging, an excessive amount of the electrolytic solution is injected inside the external casing 13.

In the first impregnation step illustrated in Step S12, a lithium ion secondary battery 10 obtained by sealing the external casing 13 is left to stand for a predetermined time, to impregnate the power generating element 20 with the electrolytic solution.

In the first roll processing step illustrated in Step S13, the lithium ion secondary battery 10 is roll-pressed by a pressure roller, to move the gas inside the power generating element 20 to the outside of the power generating element 20.

In the pre-charging step illustrated in Step S14, the lithium ion secondary battery 10 is charged at a range of 4.0 V or lower, to generate gas (inorganic gas mainly composed of hydrogen) inside the lithium ion secondary battery 10. The pre-charging step will be described in detail later.

In the second impregnation step illustrated in Step S15, the pre-charged lithium ion secondary battery 10 is left to stand for a predetermined time (one hour or more), to promote the impregnation of the electrolytic solution.

In the gas discharge step illustrated in Step S16, the external casing 13 of the lithium ion secondary battery 10 is opened, to discharge the gas inside the lithium ion secondary battery 10 to the outside. The gas discharge step will be described in detail later.

In the second roll processing step illustrated in Step S17, the lithium ion secondary battery 10 is roll-pressed by a pressure roller, to move the gas remaining inside the power generating element 20 to the outside of the power generating element 20.

In the initial charging step illustrated in Step S18, the lithium ion secondary battery 10 is charged until the cell voltage exceeds 4.0 V. The initial charging step will be described in detail later.

In the aging step illustrated in Step S19, the lithium ion secondary battery 10 that has been initially charged, is left to stand for a predetermined time, to stabilize the lithium ion secondary battery 10.

As described above, in the production method for a lithium ion secondary battery according to the present invention, a pre-charging step is carried out before the initial charging of the lithium ion secondary battery 10, to generate gas inside the lithium ion secondary battery 10. Then, the external casing 13 of the lithium ion secondary battery 10 is opened, to discharge the gas that has accumulated inside the lithium ion secondary battery 10 to the outside. Then, the external casing 13 is re-sealed, and initial charging of the lithium ion secondary battery 10 is carried out. According to such a configuration, it is possible to prevent lithium metal from depositing on the negative electrode 22 surface, in the initial charging step.

The action and effect of the production method for a lithium ion secondary battery according to the present embodiment will be described next in detail below, with reference to FIGS. 4 and 5.

Figure 4:
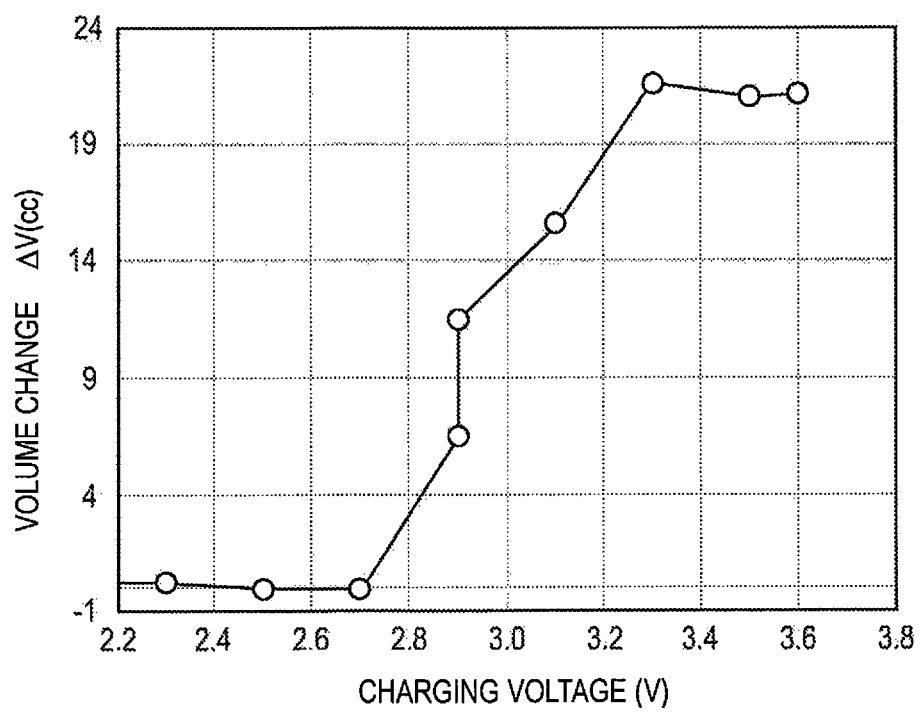
FIG. 4 is a graph illustrating the relationship between the charging voltage and the amount of gas that is generated inside the lithium ion secondary battery.

FIG. 4 is a graph illustrating the relationship between the charging voltage and the amount of gas that is generated inside the lithium ion secondary battery 10. The vertical axis of FIG. 4 is the amount of volume change of the lithium ion secondary battery 10, and the horizontal axis is the charging voltage of the lithium ion secondary battery 10.

As illustrated in FIG. 4, when initially charging a lithium ion secondary battery 10, to which electrolytic solution has been injected and that has been sealed, the amount of gas that is generated inside the lithium ion secondary battery 10 is dependent on the charging voltage of the lithium ion secondary battery 10. Specifically, when the charging voltage exceeds 2.8 V, gas that is mainly composed of hydrogen starts to be generated inside the lithium ion secondary battery 10, and the generation amount of gas becomes maximum when the charging voltage is about 3.2 V.

Therefore, in the production method for a lithium ion secondary battery 10 according to the present embodiment, before the lithium ion secondary battery 10 is charged to a cell voltage that exceeds 4.0 V, which is close to a full charge, the lithium ion secondary battery 10 is charged at a cell voltage of 4.0 V or lower, to generate gas inside the lithium ion secondary battery 10. Then, when the gas has accumulated inside the lithium ion secondary battery 10, the gas is discharged, and the gas that has accumulated inside the lithium ion secondary battery 10 is eliminated. Then, the external casing 13 is re-sealed, and the lithium ion secondary battery 10 is charged to a cell voltage that exceeds 4.0 V. According to such a configuration, since the gas inside the lithium ion secondary battery 10 is eliminated before the initial charging step, in which the lithium ion secondary battery 10 is charged to a fully-charged state, it is possible to prevent lithium metal from depositing on the negative electrode 22 surface in the initial charging step.

FIG. 5 is a view illustrating the action and effect of the production method for a lithium ion secondary battery 10 according to the present embodiment. FIG. 5A is a view illustrating the state of the lithium ion secondary battery in the production method for a lithium ion secondary battery according to the present embodiment. FIG. 5B is a view illustrating, as a comparative example, the state of a lithium ion secondary battery in a common production method for a lithium ion secondary battery, as illustrated in FIG. 6.

Figure 6:
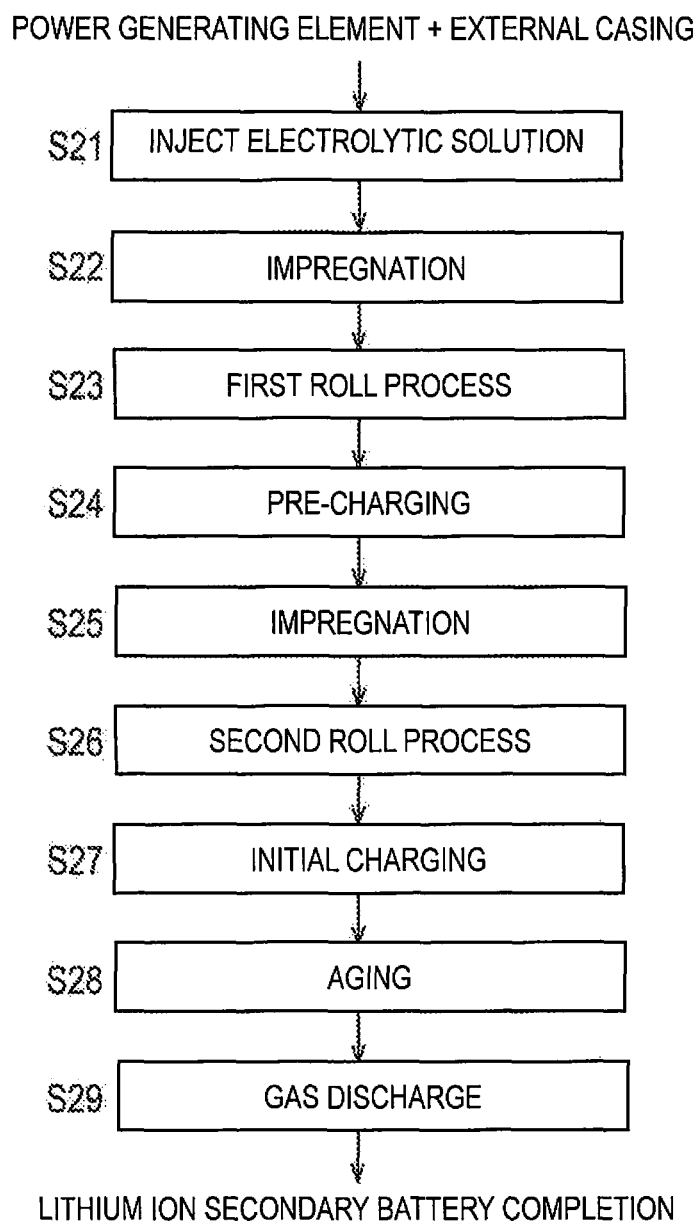
FIG. 6 is a flowchart illustrating a common production method for a lithium ion secondary battery.

As illustrated in FIG. 6, in a common production method for a lithium ion secondary battery, a gas discharge step is carried out after the pre-charging step and the initial charging step. Consequently, due to gas bubbles 41 that are generated in the pre-charging step, the area of the negative electrode active material layer 27 in which the battery reaction progresses in the initial charging step is reduced, and localized rapid charging occurs in the initial charging step, as illustrated in FIG. 5B. As a result, in a common production method for a lithium ion secondary battery, lithium metal 42 is deposited on the surface of the negative electrode active material layer 27, and the battery capacity is reduced.

On the other hand, in the production method for a lithium ion secondary battery according to the present embodiment, a gas discharge step is carried out between the pre-charging step and the initial charging step. Accordingly, the gas bubbles 41 that are generated in the pre-charging step are not present in the initial charging step, and rapid charging does not occur in the initial charging step, as illustrated in FIG. 5A. Therefore, according to the production method for a lithium ion secondary battery of the present embodiment, lithium metal is not deposited on the surface of the negative electrode active material layer 27, and the battery capacity of the lithium ion secondary battery 10 is increased. As described above, the gas that is generated in the pre-charging step is a gas that is mainly composed of hydrogen, and is generated by, for example, the hydroxyl group included in the aqueous binder of the negative electrode active material being decomposed.

The pre-charging step, the gas discharge step, and the initial charging step according to the present embodiment will be described next in detail below, with reference to FIG. 7 to FIG. 14.

Figure 7:
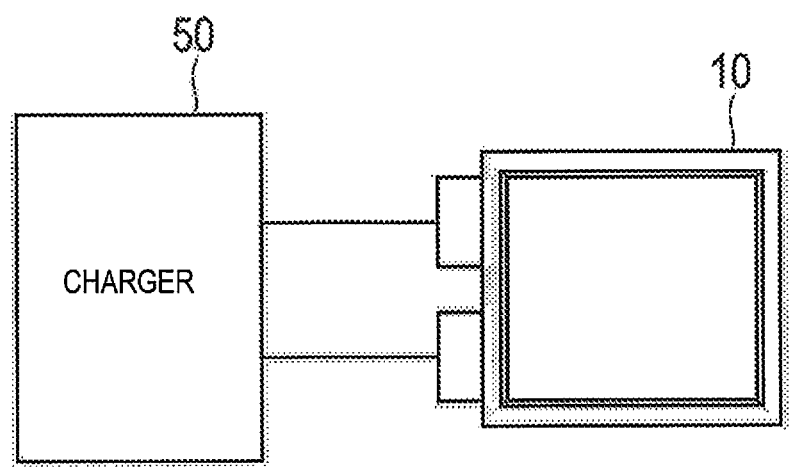
FIG. 7 is a view illustrating a pre-charging step.

FIG. 7 is a view illustrating a pre-charging step. In the pre-charging process according to the present embodiment, a charger 50 executes a pre-charging process and charges the lithium ion secondary battery 10.

Figure 8:
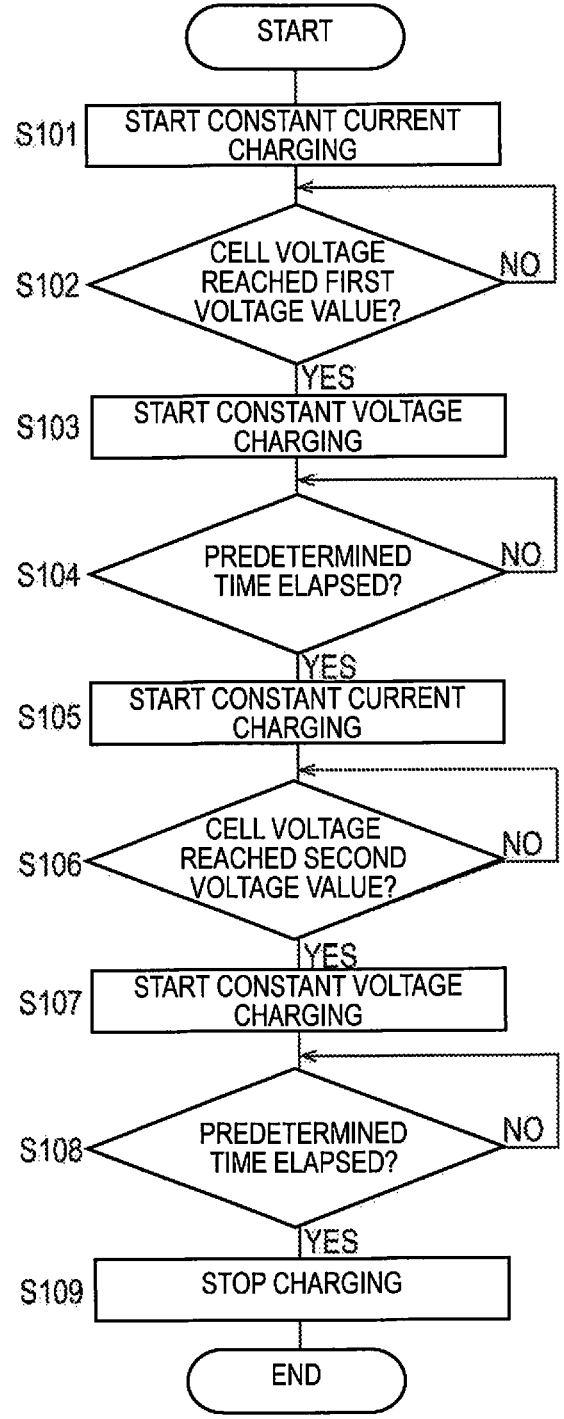
FIG. 8 is a flowchart illustrating the procedure of the pre-charging process.

FIG. 8 is a flowchart illustrating the procedure of the pre-charging process that is executed by the charger 50.

First, the charger 50 starts a constant current charging of the lithium ion secondary battery 10 (Step S101). More specifically, the charger 50 sets the charging current to a predetermined current value (for example 0.2 C/s) and starts a constant current charging of the lithium ion secondary battery 10.

Next, the charger 50 determines whether or not the cell voltage of the lithium ion secondary battery 10 has reached a first voltage value (Step S102). Here, the first voltage value is a predetermined voltage value of 2.8 V or less (for example 2.7 V) that is a voltage value with which an SEI (solid electrolyte interface) film can be formed without generating gas inside the lithium ion secondary battery 10.

If it is determined that the cell voltage of the lithium ion secondary battery 10 has not reached the first voltage value (Step S102: NO), the charger 50 stands by until the cell voltage reaches the first voltage value.

On the other hand, if it is determined that the cell voltage has reached the first voltage value (Step S102: YES), the charger 50 starts a constant voltage charging of the lithium ion secondary battery 10 (Step S103). More specifically, the charger 50 sets the charging voltage to a first voltage value, and starts a constant voltage charging of the lithium ion secondary battery 10.

Next, the charger 50 determines whether or not a predetermined time has elapsed (Step S104). If it is determined that the predetermined time has not elapsed (Step S104: NO), the charger 50 stands by until the predetermined time has elapsed.

On the other hand, if it is determined that the predetermined time has elapsed (Step S104: YES), the charger 50 starts a constant current charging of the lithium ion secondary battery 10 (Step S105). More specifically, the charger 50 sets the charging current to a predetermined current value (for example 0.3 C/s) and starts a constant current charging of the lithium ion secondary battery 10.

Next, the charger 50 determines whether or not the cell voltage of the lithium ion secondary battery 10 has reached a second voltage value (Step S106). Here, the second voltage value is a predetermined voltage value of 4.0 V or less (for example 3.4 V) that is a voltage value with which gas can be generated inside the lithium ion secondary battery 10.

If it is determined that the cell voltage has not reached the second voltage value (Step S106: NO), the charger 50 stands by until the cell voltage reaches the second voltage value.

On the other hand, if it is determined that the cell voltage has reached the second voltage value (Step S106: YES), the charger 50 starts a constant voltage charging of the lithium ion secondary battery 10 (Step S107). More specifically, the charger 50 sets the charging voltage to a second voltage value, and starts a constant voltage charging of the lithium ion secondary battery 10.

Next, the charger 50 determines whether or not a predetermined time has elapsed (Step S108). If it is determined that the predetermined time has not elapsed (Step S108: NO), the charger 50 stands by until the predetermined time has elapsed.

On the other hand, if it is determined that the predetermined time has elapsed (Step S108: YES), the charger 50 stops the charging (Step S109), and ends the process.

As described above, according to the process of the flowchart illustrated in FIG. 8, first, the lithium ion secondary battery 10 is charged by a constant current-constant voltage charging method, until the cell voltage has reached a first voltage value of 2.8 V or less. Then, the lithium ion secondary battery 10 is charged by a constant current-constant voltage charging method until the cell voltage has reached a second voltage value of 4.0 V or less. According to such a configuration, by first charging the lithium ion secondary battery 10 until the cell voltage reaches a first voltage value, it is possible to decompose the electrolyte additive and to form an SEI film on the negative electrode 22 surface without generating gas inside the lithium ion secondary battery 10. That is, it is possible to uniformly form an SEI film on the negative electrode 22 surface.

If MMDS is used as the electrolyte additive, when the cell voltage of the lithium ion secondary battery 10 exceeds 2.0 V, the SEI film starts to be formed and will no longer be formed at about 2.7 V. Furthermore, to reference FIG. 4 again, gas is not generated inside the lithium ion secondary battery 10 at a cell voltage of 2.8 V or less.

Therefore, in the pre-charging step according to the present embodiment, by carrying out charging until the cell voltage of the lithium ion secondary battery 10 has reached a first voltage value, which is 2.8 V or less, as a pre-charging of the first stage, it is possible to form an SEI film on the negative electrode 22 surface without generating gas. Thereafter, by charging the lithium ion secondary battery 10 to a second voltage value of 4.0 V or less, as pre-charging of the second stage, it is possible to generate gas inside the lithium ion secondary battery 10 in which an SEI film is formed.

Figure 9:
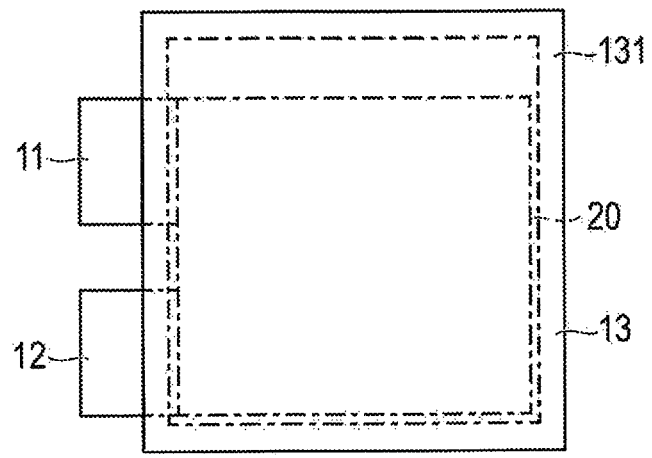
FIG. 9 is a view illustrating the outer appearance of the lithium ion secondary battery before discharging gas.

FIG. 9 is a view illustrating the outer appearance of the lithium ion secondary battery 10 before discharging gas. In the lithium ion secondary battery 10 before discharging gas, a surplus portion 131 is provided on the side of the external casing 13, as illustrated in FIG. 9. The peripheral edge portion of the external casing 13 is thermally fused, and a power generating element 20 is housed inside the external casing 13, along with an electrolytic solution.

Figure 10:
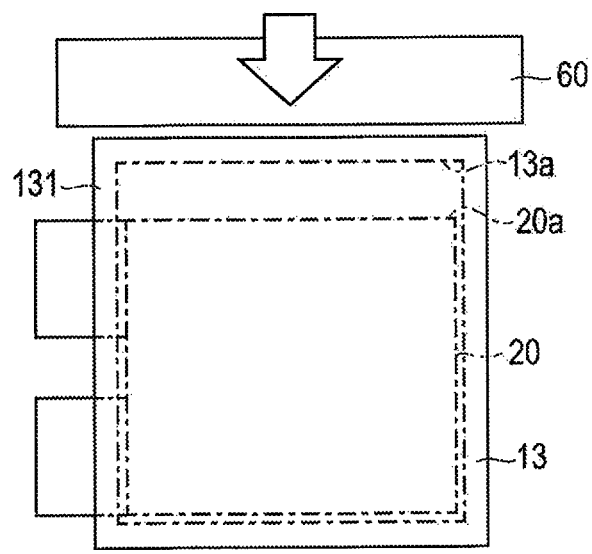
FIG. 10 is a view illustrating the gas discharge step.

In the gas discharge step, first, a pressure roller 60 roll-presses the external casing 13 from the inner circumferential end 13a of the external casing 13 toward the outer circumferential end 20a of the power generating element 20, to move the electrolytic solution present in the surplus portion 131 to the center portion of the external casing 13, as illustrated in FIG. 10.

Figure 11:
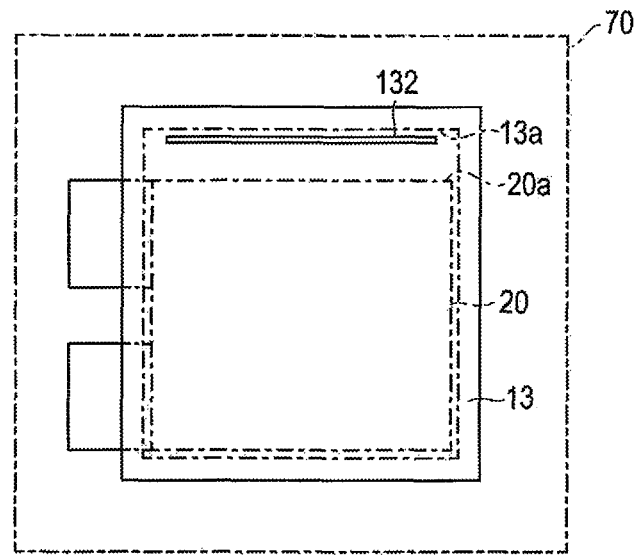
FIG. 11 is a view illustrating the gas discharge step.

Next, a gas discharge hole 132 is formed between the inner circumferential end 13a of the external casing 13 and the outer circumferential end 20a of the power generating element 20 to open the external casing 13 and to discharge the gas, as illustrated in FIG. 11. Specifically, a dedicated gas discharge hole forming device (not shown) first forms a slit-shaped gas discharge hole 132 in a predetermined position of the external casing 13. Then, the lithium ion secondary battery 10 to which the gas discharge hole 132 has been formed is placed in a decompression chamber 70, and the gas that is accumulated inside the lithium ion secondary battery 10 is discharged.

Figure 12:
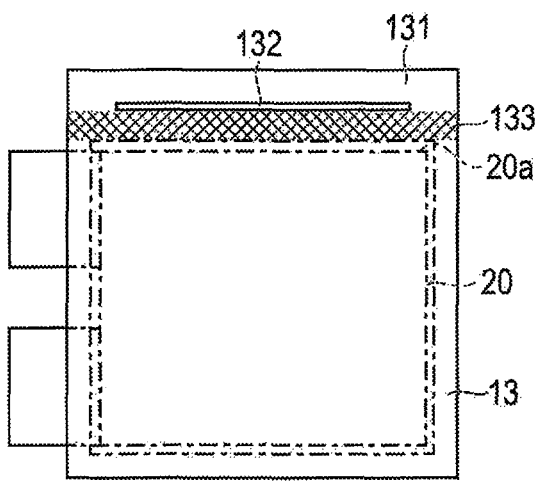
FIG. 12 is a view illustrating the gas discharge step.
Figure 13:
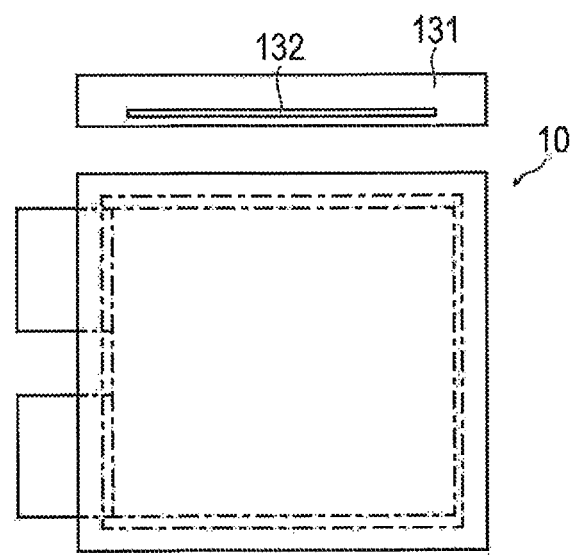
FIG. 13 is a view illustrating the gas discharge step.

Next, the portion 133 of the external casing positioned between the gas discharge hole 132 and the outer circumferential end 20a of the power generating element 20 is thermally fused, to seal the external casing 13, as illustrated in FIG. 12. Then, the external casing 13 positioned outside of the thermally fused portion 133 is cut and separated, and the gas discharge step of the lithium ion secondary battery 10 is completed, as illustrated in FIG. 13.

<Initial Charging Step>

Figure 14:
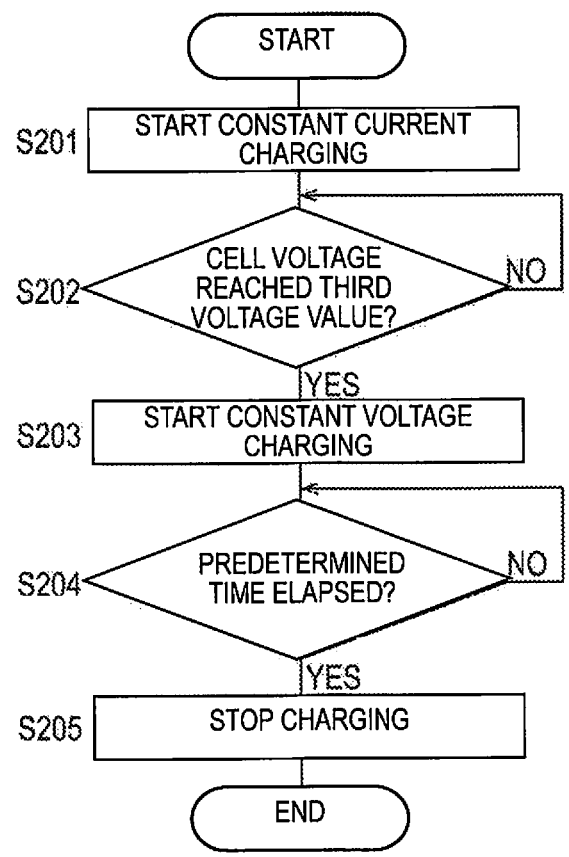
FIG. 14 is a flowchart illustrating the procedure of the initial charging process.

FIG. 14 is a flowchart illustrating the procedure of the initial charging process that is executed by the charger 50.

First, the charger 50 starts a constant current charging of the lithium ion secondary battery 10 (Step S201). More specifically, the charger 50 sets the charging current to a predetermined current value (for example 0.3 C/s) and starts a constant current charging of the lithium ion secondary battery 10.

Next, the charger 50 determines whether or not the cell voltage of the lithium ion secondary battery 10 has reached a third voltage value (Step S202). Here, the third voltage value is a predetermined voltage value of more than 4.0 V (for example 4.2 V) that is a voltage value with which the lithium ion secondary battery 10 can be charged to a fully-charged state.

If it is determined that the cell voltage has not reached the third voltage value (Step S202: NO), the charger 50 stands by until the cell voltage reaches the third voltage value.

On the other hand, if it is determined that the cell voltage has reached the third voltage value (Step S202: YES), the charger 50 starts a constant voltage charging of the lithium ion secondary battery 10 (Step S203). More specifically, the charger 50 sets the charging voltage to a third voltage value, and starts a constant voltage charging of the lithium ion secondary battery 10.

Next, the charger 50 determines whether or not a predetermined time has elapsed (Step S204). If it is determined that the predetermined time has not elapsed (Step S204: NO), the charger 50 stands by until the predetermined time has elapsed.

On the other hand, if it is determined that the predetermined time has elapsed (Step S204: YES), the charger 50 stops the charging (Step S205), and ends the process.

As described above, according to the process of the flowchart illustrated in FIG. 14, the lithium ion secondary battery 10 is charged by a constant current-constant voltage charging method, until the cell voltage has reached a third voltage value of 4.0 V or more.

The characteristics of the lithium ion secondary battery 10 that is produced by the production method for a lithium ion secondary battery according to the present invention will be described below, with reference to FIG. 15.

In the production method for a lithium ion secondary battery 10, organic gas is generated inside the lithium ion secondary battery 10 in the aging step after the initial charging step. Here, in the lithium ion secondary battery 10 according to the present invention, at a point in time before 30 days have elapsed after shipment (or before ten charge/discharge cycles have elapsed after shipment), the proportion of the volume of the organic gas relative to the volume of the internal space of the external casing 13 is 2% or more.

Figure 15:
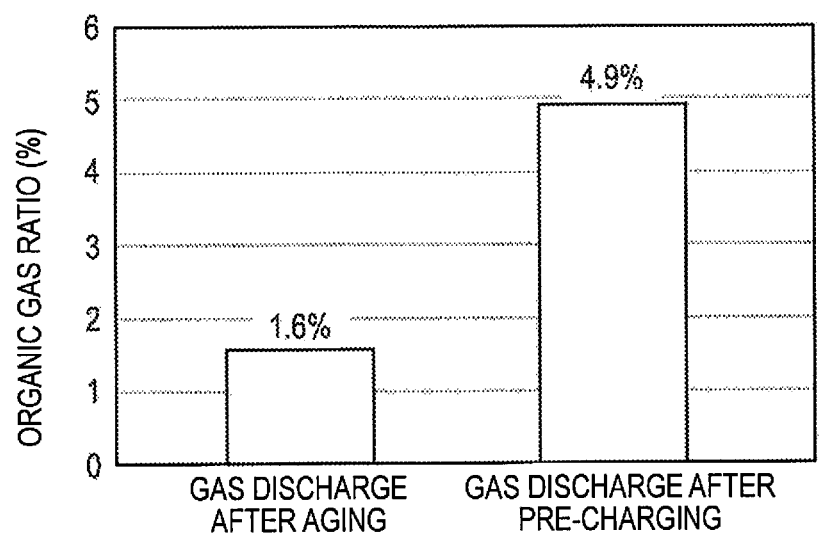
FIG. 15 is a graph illustrating the proportion of organic gas that is accumulated inside the lithium ion secondary battery.

FIG. 15 is a graph illustrating the proportion of the organic gas that is accumulated inside the lithium ion secondary battery 10. FIG. 15 illustrates, as a comparative example, the proportion of the organic gas inside the lithium ion secondary battery produced by a common production method for a lithium ion secondary battery, as illustrated in FIG. 6. With respect to the lithium ion secondary battery produced by common production method for a lithium ion secondary battery, the volume of the organic gas was measured twice, immediately after the gas discharge step and after 30 days had elapsed after the gas discharge step, and the two measured values indicate the same value. On the other hand, with respect to the lithium ion secondary battery 10 according to the present embodiment, the volume of the organic gas was measured twice, immediately after the aging step and after 30 days had elapsed after the aging step, and the two measured values indicate the same value.

As illustrated on the left side of FIG. 15, since the gas discharge step is carried out after the aging step in a common lithium ion secondary battery, the proportion of the organic gas that is present inside the lithium ion secondary battery is little, at 1.6%. On the other hand, as illustrated on the right side of FIG. 15, since the gas discharge step is carried out before the aging step in the lithium ion secondary battery 10 according to the present embodiment, the proportion of the organic gas is large, at 4.9%. In the lithium ion secondary battery 10 according to the present embodiment, in which the proportion of the organic gas is 2% or more, lithium metal is not deposited on the negative electrode 22 surface, and the battery capacity is increased.

As described above, the present embodiment exerts the following effects.

(a) Since the lithium ion secondary battery is charged at a range of 4.0 V or lower to discharge gas before the lithium ion secondary battery is charged to a cell voltage that exceeds 4.0 V, which is close to a full charge, it is possible to prevent lithium metal from depositing on the negative electrode surface in the initial charging step.

(b) In the pre-charging step, since the lithium ion secondary battery is first charged at a range of 2.8 V or lower, it is possible to form an SEI film on the negative electrode surface without generating gas. As a result, an SEI film is uniformly formed on the negative electrode surface and the durability of the lithium ion secondary battery is increased.

(c) In the pre-charging step, since the lithium ion secondary battery is charged by a constant current-constant voltage charging method, it is possible to easily control the cell voltage of the lithium ion secondary battery to a target value.

(d) Since the lithium ion secondary battery is left to stand for one hour or more between the pre-charging step and the gas discharge step, the SEI film that is formed on the negative electrode surface is stabilized.

(e) In the gas discharge step, since the space between the inner circumferential end of the external casing and the outer circumferential end of the power generating element is sealed, the gas discharge step is facilitated, and the productivity of the lithium ion secondary battery is increased.

(f) In the gas discharge step, since a roll press is used to move the electrolytic solution, which is in the opening position to the power generating element side, it is possible to prevent leakage of the electrolytic solution from the opening portion, at the time of opening. It is thereby possible to reduce the amount of electrolytic solution that is injected in the electrolytic solution injection step. In addition, it is possible to omit the work to wipe off the electrolytic solution after the gas discharge step. As a result, it is possible to suppress the production cost of the lithium ion secondary battery.

(g) Since the external casing is sealed by thermal fusion, the sealing can be facilitated.

(h) Since the surplus portion of the external casing is cut and separated, it becomes possible to miniaturize the lithium ion secondary battery. In addition, it becomes possible to tightly package the lithium ion secondary battery.

(i) Since gas discharge is carried out under reduced pressure, it is possible to easily remove gas from the inside of the lithium ion secondary battery. As a result, the productivity of the lithium ion secondary battery is increased.

(j) In the initial charging step, since the lithium ion secondary battery is charged by a constant current-constant voltage charging method, it is possible to easily control the cell voltage of the lithium ion secondary battery to a target value.

(k) Since an aqueous binder is used for the negative electrode, it is possible to increase the capacity of the negative electrode compared to when using an organic solvent binder. Furthermore, it is possible to greatly suppress capital investment for the production line, and to achieve a reduction in the environmental burden.

(l) Since an SBR/CMC mixed binder is used, it is possible to easily produce a lithium ion secondary battery.

(m) Since the amount of organic gas that is included inside the lithium ion secondary battery is 2% or more, it is possible to provide a lithium ion secondary battery with an increased battery capacity.

(n) Since the amount of organic gas at a point in time within 10 cycles after shipment is 2% or more, it is possible to provide a lithium ion secondary battery with an increased battery capacity.

(o) Since the amount of organic gas at a point in time within 30 days after shipment is 2% or more, it is possible to provide a lithium ion secondary battery with an increased battery capacity.

As described above, the production method for a lithium ion secondary battery and a lithium ion secondary battery of the present invention were described in the embodiment. However, it goes without saying that a person skilled in the art can appropriately add, modify, or make omissions to the present invention within the scope of the technical concept thereof.

For example, in the above-described embodiment, the lithium ion secondary battery is first charged to a first voltage value, and then charged to a second voltage value, in the pre-charging step. However, it is not necessary for the lithium ion secondary battery to be pre-charged in two stages; the lithium ion secondary battery may be charged to a second voltage value from the start, without setting a first voltage value.

In addition, in the above-described embodiment, an example of a lithium ion secondary battery was described in which a positive electrode lead and a negative electrode lead are respectively led out from the same end of the external casing. However, the mode of the lithium ion secondary battery of the present invention is not limited thereto, and may be a lithium ion secondary battery in which a positive electrode lead and a negative electrode lead are respectively led out from opposing ends of an exterior material.

The invention claimed is:

1. A production method for producing a lithium ion secondary battery formed by sealing a power generation element having a positive electrode and a negative electrode stacked together with a separator and an electrolytic solution inside an external casing, the production method comprising:

Step (1) charging the lithium ion secondary battery at a cell voltage of the lithium ion secondary battery to a first voltage of 2.8 V or less;

Step (2) charging the lithium ion secondary battery to a second voltage of 2.8 V to 4.0 V after a first predetermined time has elapsed after the battery reaches the first voltage;

Step (3) opening the external casing of the lithium ion secondary battery after the battery has been charged to the second voltage to discharge gas inside the lithium ion secondary battery to an exterior, and then re-sealing the external casing; and Step (4) charging the lithium ion secondary battery from which the gas has been discharged to a third voltage greater than 4.0 V.

2. The production method according to claim 1, wherein the lithium ion secondary battery is charged by a constant current-constant voltage charging method in the Steps (1) and (2).

3. The production method according to claim 1, wherein the the first predetermined time is one hour or more.

4. The production method according to claim 1, wherein a space between an outer circumferential end of the power generating element and an inner circumferential end of the external casing that opposes the outer circumferential end is sealed in the Step (3).

5. The production method according to claim 4, wherein the lithium ion secondary battery is roll-pressed from the inner circumferential end of the external casing toward the outer circumferential end of the power generating element in the Step (3).

6. The production method according to claim 4, wherein the external casing is formed of a material that can be thermally fused; and the external casing is resealed by thermally fusing a portion of the external casing positioned between the outer circumferential end of the power generating element and an opening portion of the external casing, the opening portion being formed by the opening of the external casing in the Step (3).

7. The production method according to claim 6, wherein the external casing is cut between the portion that is thermally fused and the opening portion, after the external casing is re-sealed, in the Step (3).

8. The production method according to claim 1, wherein the discharging the gas is performed in a decompression chamber.

9. The production method according to claim 1, wherein the lithium ion secondary battery is charged by a constant current-constant voltage charging method, in the Step (4).

10. The production method according to claim 1, wherein the negative electrode of the power generating element contains an aqueous binder.

11. The production method according to claim 10, wherein the aqueous binder is a mixture of styrene butadiene rubber (SBR) and carboxymethyl cellulose (CMC).

12. The production method according to claim 1, wherein the Step (3) of opening the external casing of the lithium ion secondary battery to discharge gas inside the lithium ion secondary battery to the exterior is performed after a second predetermined time has elapsed after the battery reaches the second voltage.

* * * * *